United States Patent [19]

Hayashi et al.

[11] Patent Number: 5,018,384
[45] Date of Patent: May 28, 1991

[54] ROTATIONAL SPEED DETECTOR

[75] Inventors: Yoshitaka Hayashi; Hayato Ohmi, both of Kanagawa, Japan

[73] Assignee: Nippon Seiko Kabushiki Kaisha, Tokyo, Japan

[21] Appl. No.: 555,205

[22] Filed: Jul. 19, 1990

[30] Foreign Application Priority Data

Jul. 21, 1989 [JP] Japan ................................ 1-187555
Mar. 1, 1990 [JP] Japan ................................ 2-47243
Apr. 19, 1990 [JP] Japan ................................ 2-101692

[51] Int. Cl.$^5$ ............................................. G01M 19/00
[52] U.S. Cl. ................................... 73/118.1; 73/866.5
[58] Field of Search .......................... 73/118.1, 866.5; 384/448; 324/173, 174

[56] References Cited

U.S. PATENT DOCUMENTS 4,164,864 8/1979 Feller ................................... 73/118.1
4,667,156 5/1987 Machino et al. ..................... 324/173
4,783,180 11/1988 Hayashi ............................... 384/448
4,795,278 1/1989 Hayashi ............................... 384/448

FOREIGN PATENT DOCUMENTS 46331 11/1977 Japan .
249069 10/1987 Japan .

Primary Examiner—Jerry W. Myracle
Attorney, Agent, or Firm—Caesar, Rivise, Bernstein, Cohen & Pokotilow, Ltd.

[57] ABSTRACT

A rotational speed detector which is incorporated in an antiskid brake system for an automobile to detect a rotational speed of a wheel. A rotational speed sensor assembly which is provided on either one of the outer and inner rings of a wheel is biased toward a sensor rotor that is provided on the other of the two rings in such a manner that the sensor assembly is slidable on the sensor rotor, thereby maintaining the distance between the rotational speed sensor assembly and the sensor rotor at a constant level.

9 Claims, 10 Drawing Sheets

ROTATIONAL SPEED DETECTOR

BACKGROUND OF THE INVENTION

1. Field of the Invention

The present invention relates to a rotational speed detector which is incorporated in an antiskid brake system (hereinafter referred as simply "ABS") for an automobile to detect a rotational speed of a wheel when braked in order to prevent locking of the wheel during braking (i.e., the phenomenon that the wheel is completely prevented from rotating although the automobile is still being driven), or which is designed to detect a rotational speed of each of the shafts that are incorporated in an automatic transmission in order to obtain a timing at which the shafts are to be locked up (i.e., the shafts are mechanically coupled together).

2. Description of the Prior Art

It is common practice to detect a rotational speed of a shaft in a variety of machinery. In ABS, for example, a rotational speed of a wheel when braked has heretofore been detected by a rotational speed detector, e.g., those disclosed in Japanese Patent Post-Exam. Publication No. 52-46331 (corresponding U.S. Pat. No. 4,069,435) and Japanese Patent Public Disclosure (KOKAI) No. 62-249069.

The rotational speed detector that is disclosed in Japanese Patent Post-Exam. Publication No. 52-46331 is arranged as shown in FIG. 1.

Referring to FIG. 1, reference numeral 1 denotes a hub, and a flange 2 for securing a wheel is rigidly secured to the outer peripheral surface of the hub 1. The outer peripheral surface of the hub 1, which is a rotating member, is formed with outward tracks 3. An outer ring 4 is supported by a suspension system, and rolling elements 5 are disposed between the outward tracks 3 formed in the outer peripheral surface of the hub 1 and inward tracks 6 that are formed in the inner peripheral surface of the outer ring 4, thereby enabling the hub 1 to rotate inside the outer ring 4.

A gear-shaped sensor rotor 7 is rigidly secured to one end portion of the hub 1, and a rotational speed sensor 8 is provided on a part of a cover 9 which faces the sensor rotor 7, the cover 9 being secured to one end portion of the outer ring 4, so that it is possible to detect a rotational speed of the hub 1 having the sensor rotor 7 secured thereto.

In the rotational speed detector that is disclosed in Japanese Patent Public Disclosure (KOKAI) No. 62-249069, as shown in FIG. 2, a sensor rotor 7 is secured to the outer peripheral surface of the intermediate portion of a hub 1, and one end portion of a rotational speed sensor 8 which extends through an outer ring 4 faces the outer peripheral edge of the sensor rotor 7.

In these known rotational speed detectors, as the sensor rotor 7 rotates together with the hub 1, the output voltage from the rotational speed sensor 8, which is provided in opposing relation to the sensor rotor 7, changes.

The frequency of the output voltage from the rotational speed sensor 8 that changes with the rotation of the sensor rotor 7 secured to the hub 1 is proportional to the number of revolutions of the hub 1. Therefore, if the output signal from the rotational speed sensor 8 is inputted to a controller (not shown), it is possible to determine the number of revolutions (rotational speed) of the wheel that is secured to the hub 1.

There has heretofore been another type of rotational speed detector wherein, as shown in FIG. 3, a sensor rotor 12 which comprises a short cylinder-shaped body 10 with a multiplicity of equally spaced through-holes 11 is firmly fitted around the outer peripheral surface of a rotating member 13, and a rotational speed sensor 15 is provided on a housing-like member 14, for example, an outer ring, which surrounds the periphery of the rotating member 13 in such a manner that the sensor 15 faces the sensor rotor 12.

However, the conventional rotational speed detectors such as those described above involve the following problems:

In the prior art, the sensor rotor 7 is secured to a rotating member, for example, the hub 1, and the rotational speed sensor 8 is secured to a stationary member, for example, the outer ring 4, in such a manner that the sensor rotor 7 and the rotational speed sensor 8 face each other at a predetermined distance. Therefore, under certain circumstances, the output voltage from the rotational speed sensor 8 is not constant.

The voltage of a signal that is delivered from the rotational speed sensor 8 varies greatly with the distance between the rotational speed sensor 8 and the sensor rotor 7, and this distance changes subtly due to errors in manufacturing the hub 1, the outer ring 4 and the sensor rotor 7. Even when the manufacturing errors of these members 1, 4 and 7 are so small that they may be neglected, if the hub 1 and the outer ring 4 are elastically deformed by the stress that is applied to these members 1 and 4 during the running of the automobile, the distance between the rotational speed sensor 8 and the sensor rotor 7 changes temporarily.

If the change in the distance between the rotational speed sensor 8 and the sensor rotor 7 is small and the voltage of the signal delivered from the rotational speed sensor 8 is adequate for the detection, no particular problem arises. However, if this distance increases by an excessive amount, the absolute value of the output signal voltage becomes inadequate to detect a number of revolutions of the wheel by the controller, even if it is a temporary phenomenon.

SUMMARY OF THE INVENTION

It is an object of the present invention to provide a rotational speed detector which is free from the above-described problems of the prior art.

To this end, the present invention provides a rotational speed detector which is provided on a first member and a second member, which rotate relative to each other, to detect the relative rotation, the detector comprising: a sensor rotor which is secured to the first member; a rotational speed sensor assembly which is slidable relative to the first member but unable to rotate relative to the second member; and a biasing device which biases the rotational speed sensor assembly toward the sensor rotor so that the rotational speed sensor assembly is in contact with either the sensor rotor or the first member, thereby maintaining the distance between the rotational speed sensor assembly and the sensor rotor at a constant level.

The function per se of the rotational speed detector of the present invention to detect a rotational speed of a wheel, for example, which is rotatably supported by rolling bearings is the same as that of the conventional rotational speed detectors described above.

In the rotational speed detector of the present invention, however, the rotational speed sensor assembly is resiliently pressed toward the sensor rotor so that the distance between the sensor assembly and the sensor rotor is maintained at a constant level at all times. Thus, the detection of a rotational speed of a wheel that is rotatably supported by rolling bearings can be reliably effected in a stable state at all times.

DESCRIPTION OF THE PREFERRED EMBODIMENTS

The present invention will be described below more specifically by way of embodiments and with reference to the accompanying drawings.

Figure 4:
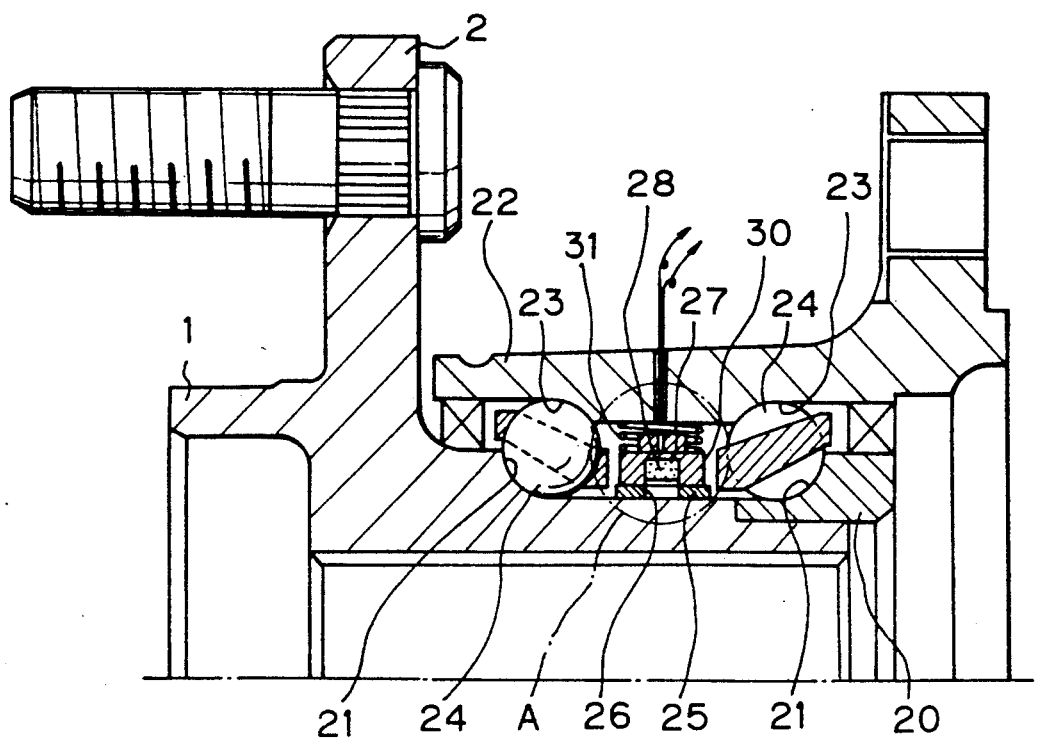
FIG. 4 is a fragmentary sectional view of a first embodiment of the rotational speed detector according to the present invention.
Figure 5:
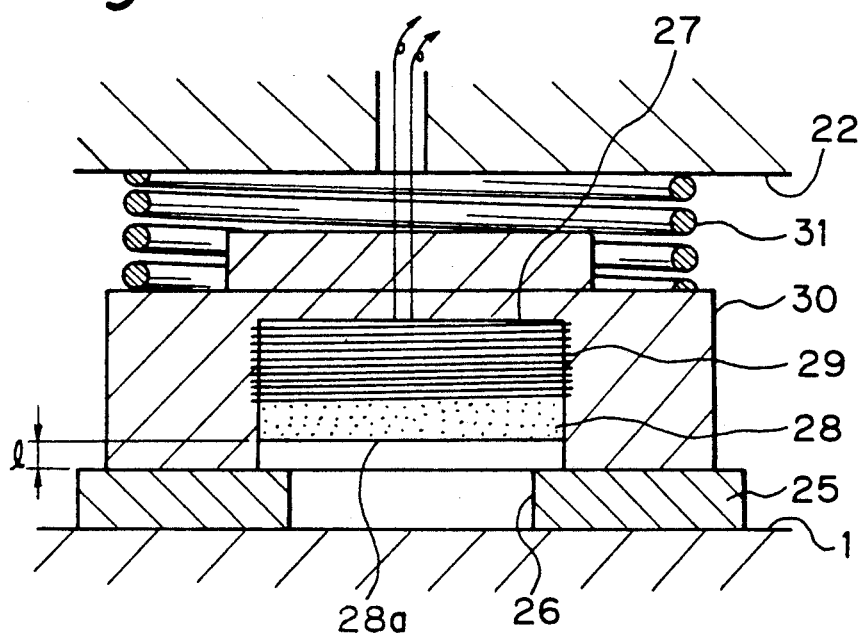
FIG. 5 is an enlarged view of the part A of the arrangement shown in FIG. 4.

FIGS. 4 and 5 show a first embodiment of the present invention. FIG. 4 is a fragmentary sectional view of the embodiment, showing a half of it, and FIG. 5 is an enlarged view of the part A of the arrangement shown in FIG. 4.

A hub 1 has an outward track 21 formed in the outer peripheral surface, and an inner ring 20 that is firmly fitted on the hub 1 also has an outward track 21 formed on the outer peripheral surface thereof. An outer ring 22 has inward tracks 23 formed in the inner peripheral surface. A plurality of rolling elements 24 are disposed between the outer tracks 21 and the inner tracks 23 in such a manner that the inner and outer peripheral sides of each rolling element 24 are in contact with the outward and inward tracks 21 and 23, respectively. Thus, as the rolling elements 24 roll, the hub 1 for securing a wheel rotates inside the outer ring 22 that is secured to the vehicle body.

Figure 6:
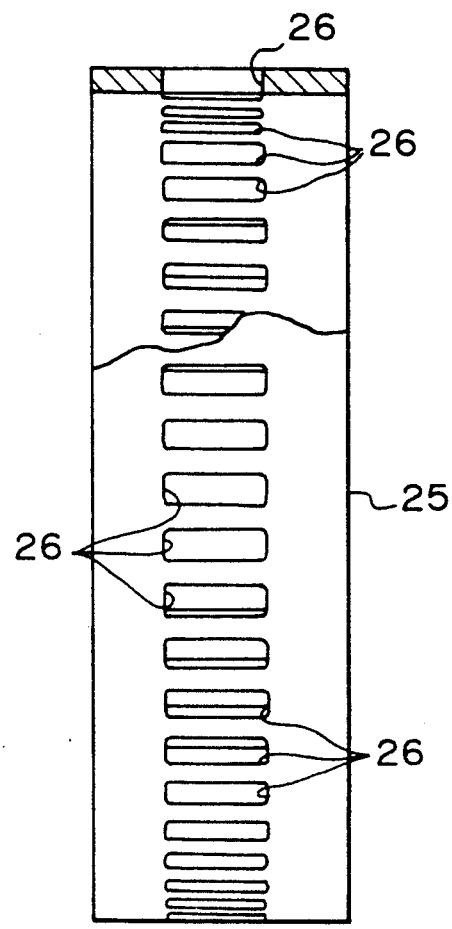
FIG. 6 is a partially-cutaway side view of a sensor rotor.

A sensor rotor 25 which is in the form of a short cylinder is firmly fitted on the outer peripheral surface of the hub 1 at a position which is off the outward track 21. The sensor rotor 25 has a plurality of through-holes 26 which are equally spaced circumferentially, as shown in FIG. 6.

A rotational speed sensor 27 faces the outer peripheral surface of the sensor rotor 25 to detect a rotational speed of the hub 1 that has the sensor rotor 25 secured thereto. The rotational speed sensor 27 comprises a permanent magnet 28 and a coil 29 which is wound around it. The rotational speed sensor 27 is accommodated within a casing 30 that is formed from a non-magnetic, low friction material, for example, nylon.

The casing 30 that is open at the inner peripheral side (i.e., the lower side as viewed in FIGS. 4 and 5) is supported at a part of the inner peripheral side of the outer ring 4 in such a manner that it is movable only diametrically (i.e., vertically as viewed in FIGS. 4 and 5). A compression spring 31 is provided between the outer periphery of the casing 30 and the inner peripheral surface of the outer ring 4.

Accordingly, both edge portions of the opening in the casing 30 are in resilient contact with a portion of the outer peripheral surface of the sensor rotor 25 which is off the through-holes 26.

In the rotational speed detector according to the present invention, arranged as described above, the function per se that is performed to detect a rotational speed of a wheel which is rotatably supported by rolling bearings that comprise the rolling elements 24 is the same as that of the conventional rotational speed detectors described above.

More specifically, when the wheel that is secured to the flange 2 provided on the outer peripheral surface of the hub 1 rotates, the sensor rotor 25 rotates synchronously with the wheel, and the through-holes 26 that are formed in the sensor rotor 25 cross an end face of the permanent magnet 28 that constitutes the rotational speed sensor 27. As a result, the voltage of a current that is induced in the coil 29 around the permanent magnet 28 changes regularly, so that a rotational speed of the wheel can be obtained from the frequency of the induced current.

In the rotational speed detector of the present invention, however, the permanent magnet 28 that constitutes the rotational speed sensor 27 is accommodated in the casing 30 and this casing 30 is resiliently pressed against the outer peripheral surface of the sensor rotor 25 by means of the resilient force from the compression spring 31. Accordingly, the distance l between the end face 28a of the permanent magnet 28 that constitutes the rotational speed sensor 27 and the outer peripheral surface of the sensor rotor 25 is maintained at a constant level at all times independently of errors in manufacturing the hub 1, the outer ring 22 or the sensor rotor 25 and the elastic deformation of these members 1, 22 and 25.

Thus, the rotational speed of the wheel that is rotatably supported by a rolling bearing unit incorporating a plurality of rolling elements 24 can be reliably detected in a stable state at all times.

Figure 7:
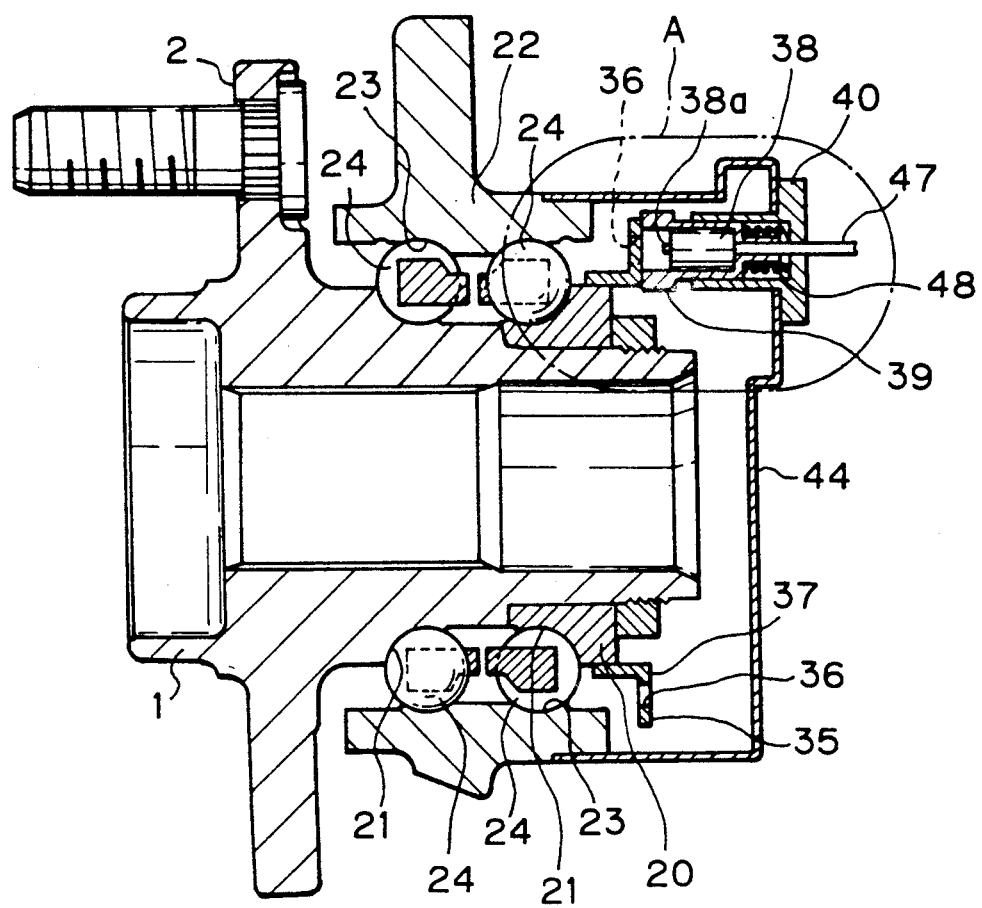
FIG. 7 is a fragmentary sectional view of a second embodiment of the rotational speed detector according to the present invention.
Figure 8:
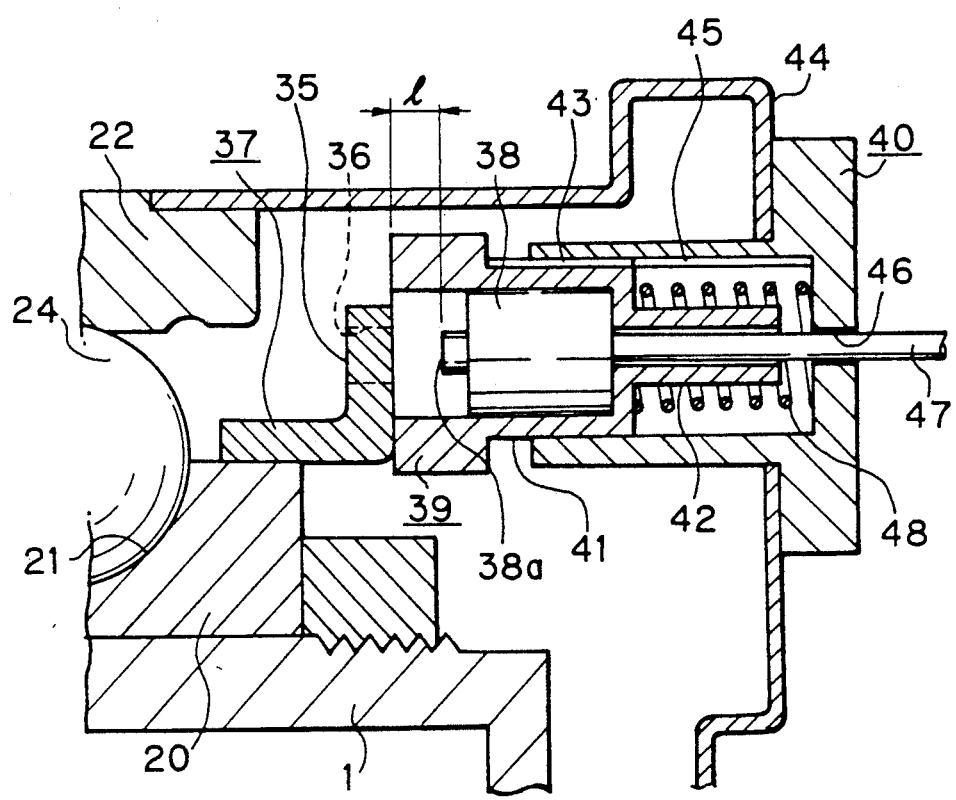
FIG. 8 is an enlarged view of the part A of the arrangement shown in FIG. 7.
Figure 9:
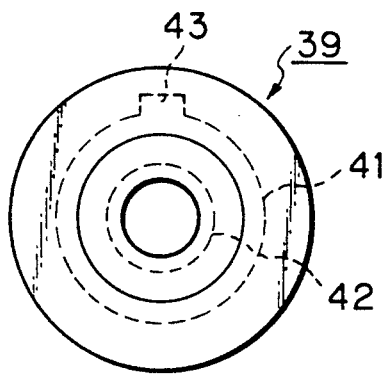
FIG. 9 is an outer side view of a first casing that is employed in the second embodiment.
Figure 10:
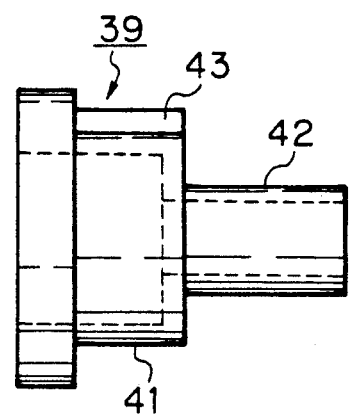
FIG. 10 is a side view of the first casing shown in FIG. 9 as viewed from the right-hand side thereof.
Figure 11:
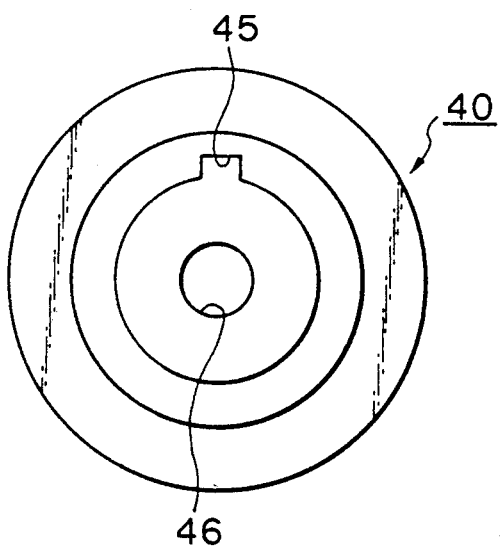
FIG. 11 is an outer side view of a second casing that is employed in the second embodiment.
Figure 12:
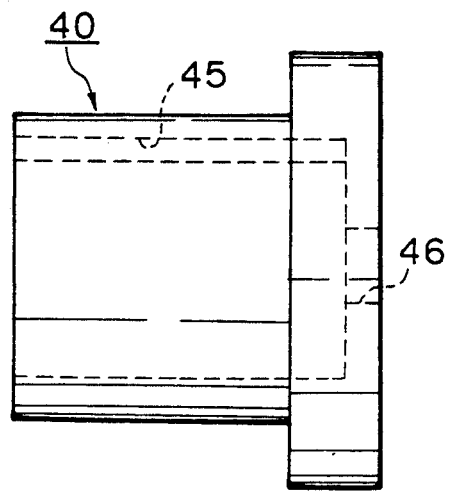
FIG. 12 is a side view of the second casing shown in FIG. 11 as viewed from the right-hand side thereof.

A second embodiment of the present invention will next be explained with referent to FIGS. 7 to 12, in which: FIG. 7 is a sectional view showing the general arrangement of the second embodiment; FIG. 8 is an enlarged view of the part A of the arrangement shown in FIG. 7; FIG. 9 is an outer side view of a first casing that is employed in the second embodiment; FIG. 10 is a side view of the first casing shown in FIG. 9 as viewed from the right-hand side thereof; FIG. 11 is an outer side view of a second casing that is employed in the second embodiment; and FIG. 12 is a side view of the second casing shown in FIG. 11 as viewed from the right-hand side thereof. In these figures, the same elements or portions as those in the first embodiment are denoted by the same reference numerals, and description thereof is omitted.

It should be noted that, although one of the two outward tracks 21 is formed directly in the outer peripheral surface of the hub 1, the two outward tracks 21 may be formed in the respective outer peripheral surfaces of a pair of inner rings 20 that are firmly fitted on the hub 1.

A sensor rotor 37 is firmly fitted on the outer peripheral surface of the inner ring 20 at a position which is inwardly (i.e., rightwardly as viewed in FIGS. 7 and 8) off the outward track 21, the sensor rotor 37 being formed by bending a metal plate in an L-shaped cross-sectional configuration and providing the resulting projecting portion 35 with a plurality of through-holes 36 which are equally spaced circumferentially.

A rotational speed sensor 38 faces the outer peripheral surface of the sensor rotor 37 to detect a rotational speed of the hub 1 that has the sensor rotor 37 secured thereto. The rotational speed sensor 38 is accommodated in a first casing 39 that is formed from a non-magnetic, readily slidable material, for example, nylon, polytetrafluoroethylene (PTFE), etc.

The first casing 39 that is open at the outer side thereof (i.e., the left-hand side as viewed in FIGS. 7 and 8) is fitted in a second casing 40 in such a manner that the first casing 39 is movable only in the direction of the axis of rotation (i.e., horizontally as viewed in FIGS. 7 and 8).

More specifically, the first casing 39 comprises, as shown in FIGS. 9 and 10, an accommodating portion 41 in the form of a short cylinder one end of which is closed, and a tubular portion 42 which extends continuously from the bottom of the accommodating portion 41 to lead a conductor 47 for taking out a signal from the rotational speed sensor 38. The outer peripheral surface of the accommodating portion 41 is formed with an engagement projection 43 which extends axially.

On the other hand, the second casing 40 is secured to a part of a cover 44 which faces the sensor rotor 37, the cover 44 being adapted to close an opening at the inner end of the outer ring 22. Thus, the second casing 40 is supported by the outer ring 22 through the cover 44. The second casing 40 is formed in the shape of a short cylinder one end of which is substantially closed. As shown in FIGS. 11 to 12, the inner peripheral surface of the second casing 40 is formed with an engagement groove 45 which is engageable with the engagement projection 43, and a through-hole 46 for passing the conductor 47 is formed in the center of the inner end wall of the second casing 40.

With the foregoing arrangement, the first casing 39 is inserted into the second casing 40 that is supported by the outer ring 22 through the cover 44 with the engagement projection 43 on the outer peripheral surface being engaged with the engagement groove 45 formed in the inner peripheral surface of the second casing 40. As a result, the first casing 39 is fitted in the second casing 40 in such a state that it is movable only axially (i.e., horizontally as viewed in FIGS. 7 and 8).

It should be noted that, in advance of the insertion of the first casing 39 into the second casing 40, a compression spring 48 is inserted into the inner part of the second casing 40 so that, after the first casing 39 has been fitted in the second casing 40, the compression spring 48 is resiliently clamped between the inner end surface of the first casing 39 and the inner bottom surface of the second casing 40.

Accordingly, the edge portion of the opening in the first casing 39 is resiliently pressed against the outer peripheral surface of the sensor rotor 37.

In the rotational speed detector according to the present invention, arranged as described above, the function per se that is performed to detect a rotational speed of a wheel which is rotatably supported by rolling bearings that comprise the rolling elements 24 is the same as that of the conventional rotational speed detectors described above.

More specifically, when the wheel that is secured to the flange 2 provided on the outer peripheral surface of the hub 1 rotates, the sensor rotor 37 rotates synchronously with the wheel, and the through-holes 36 that are formed in the sensor rotor 37 cross an end face of the rotational speed sensor 38. As a result, the voltage of a current that is induced in a coil around a permanent magnet incorporated in the sensor 38 changes regularly, so that a rotational speed of the wheel can be obtained from the frequency of the induced current.

In the rotational speed detector of the present invention, however, the rotational speed sensor 38 is accommodated in the first casing 39 and this casing 39 is resiliently pressed against the outer peripheral surface of the sensor rotor 37 by means of the resilient force from the compression spring 48. Accordingly, the distance l between the end face 38a of the rotational speed sensor 38 and the outer peripheral surface of the sensor rotor 37 is maintained at a constant level at all times independently of errors in manufacturing the hub 1, the outer ring 22 or the sensor rotor 37 and the elastic deformation of these members 1, 22 and 37.

Thus, the rotational speed of the wheel that is rotatably supported by a rolling bearing unit incorporating a plurality of rolling elements 24 can be detected reliably in a stable state at all times.

Figure 13:
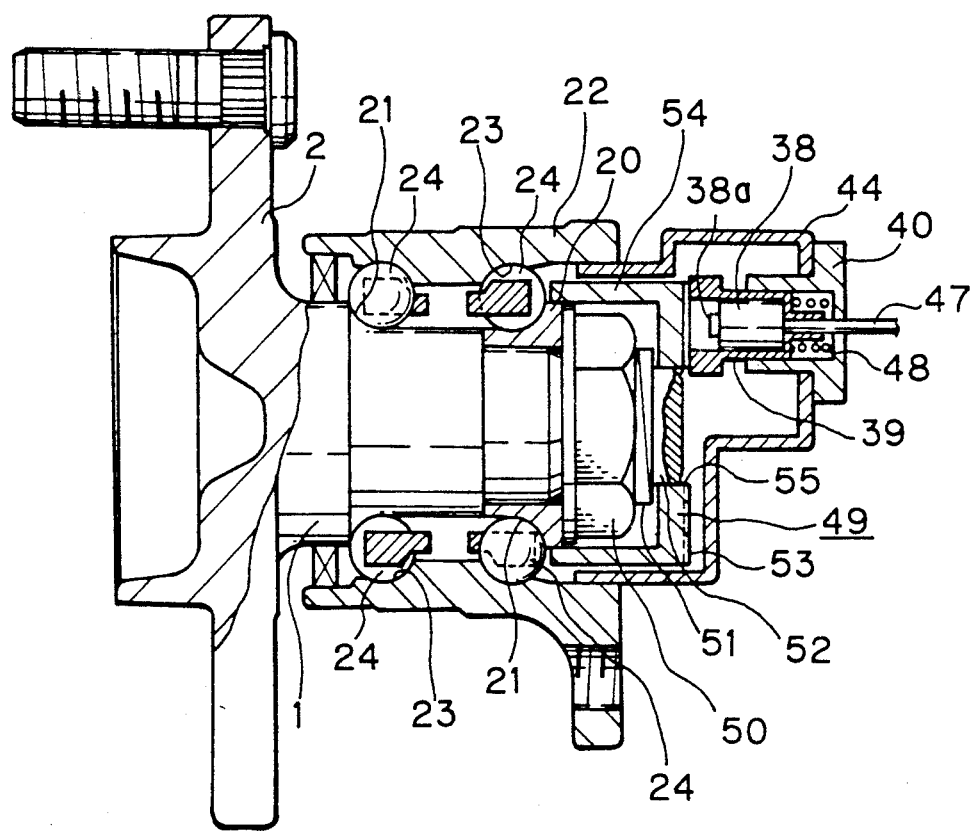
FIG. 13 is a fragmentary sectional view of a third embodiment of the rotational speed detector according to the present invention.

A third embodiment of the present invention will next be explained with reference to FIG. 13.

In this embodiment, the strength for securing a sensor rotor 49 is increased to achieve an improvement in the durability thereof.

More specifically, the hub 1 has an external thread portion 51 at the inner end portion thereof for thread engagement with a nut 50 for securing the inner ring 20. A cylindrical surface portion 52 which has the same diameter throughout its length is formed at a portion of the hub 1 which is positioned inward of the external thread portion 51 and which projects from the inner end face of the nut 50. A sensor rotor 49 is supported by this cylindrical surface portion 52.

The sensor rotor 49 comprises an annular main portion 53 which has irregularities formed on the inner side surface thereof, and a cylindrical portion 54 which extends outwardly (i.e., leftwardly as viewed in FIG. 13) from the outer peripheral edge of the main portion 53 and which is open in the same direction. The main portion 53 is fitted on the cylindrical surface portion 52 through a circular hole 55 that is formed in the center of the main portion 53, and the edge portion of the opening in the cylindrical portion 54 is fitted on the outer peripheral surface of the inner end portion of the inner ring 20, thereby securing the sensor rotor 49 to the hub 1. After the inner end portion of the hub 1 has been fitted into the circular hole 55, the outer peripheral edge of the inner end portion of the hub 1 is staked outwardly, thereby preventing the main portion 53 of the sensor rotor 49 from coming off the hub 1.

On the other hand, the rotational speed sensor 38 is resiliently supported by the cover 44 that closes the inner end opening of the outer ring 22 through the second casing 40 and the first casing 39 in the same way as in the second embodiment.

Figure 14:
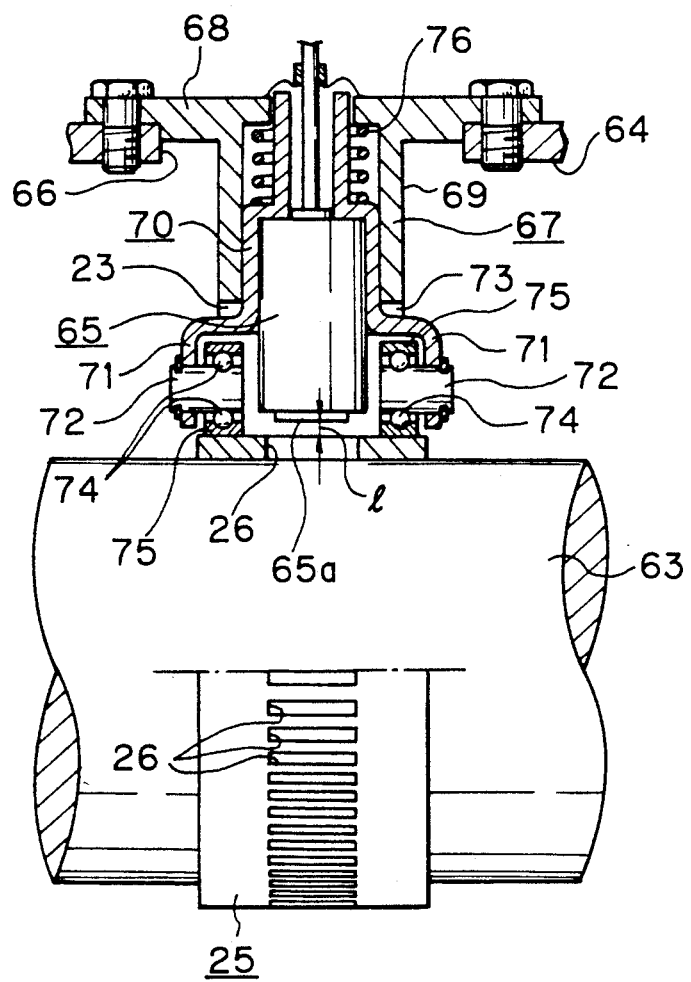
FIG. 14 is a fragmentary sectional view of a fourth embodiment of the rotational speed detector according to the present invention.
Figure 15:
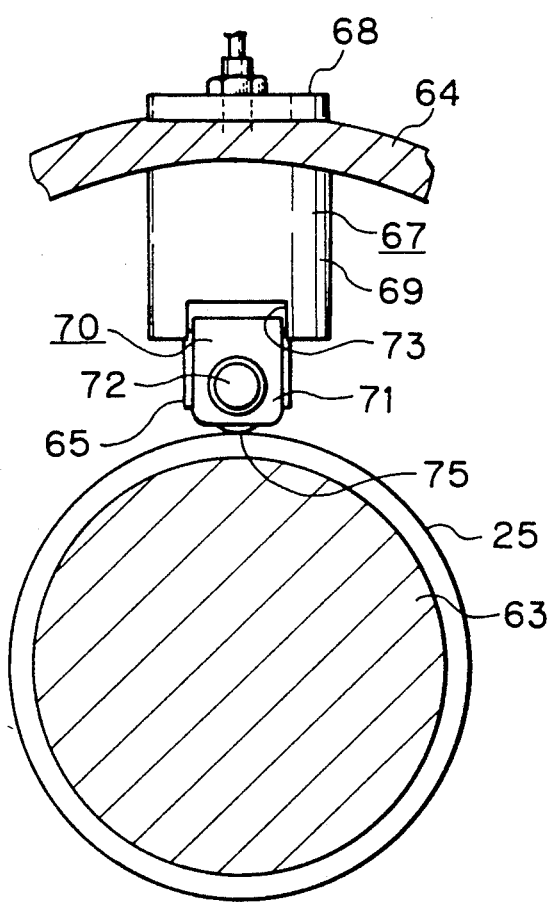
FIG. 15 is a side view of the fourth embodiment shown in FIG. 14 as viewed from one side thereof.

A fourth embodiment of the present invention will next be explained with reference to FIGS. 14 and 15, in which FIG. 14 is a fragmentary sectional view of the fourth embodiment, and FIG. 15 is a side view of the fourth embodiment shown in FIG. 14 as viewed from one side thereof.

Figure 1:
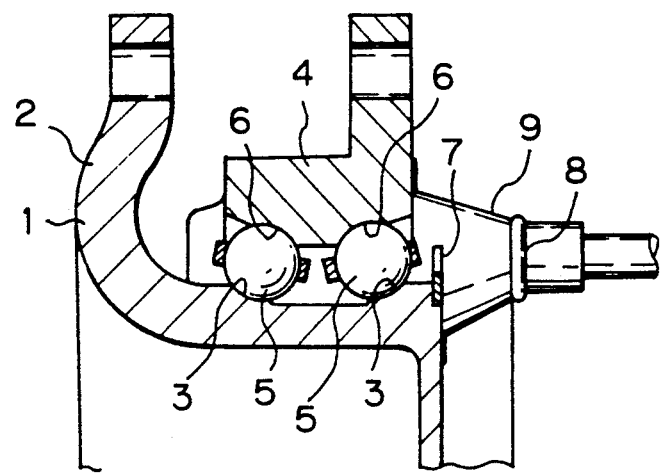
FIG. 1 is a sectional view of a conventional rotational speed detector.
Figure 2:
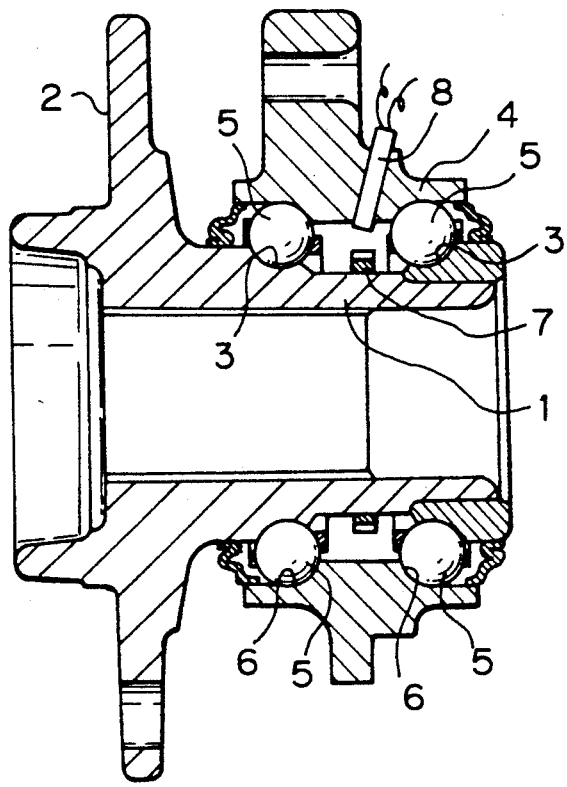
FIG. 2 is a sectional view of another conventional rotational speed detector.
Figure 3:
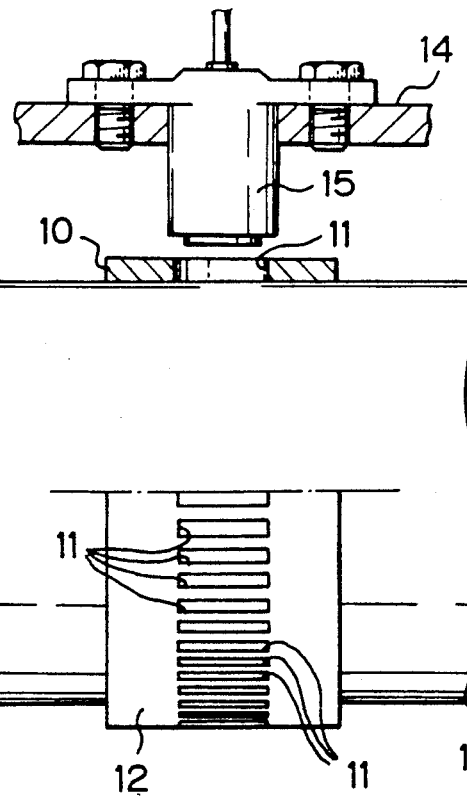
FIG. 3 is a fragmentary view of still another conventional rotational speed detector.

Reference numeral 63 denotes a rotating member, which is equivalent to the hub 1 in the case of a rotational speed detector such as that shown in FIG. 2. Reference numeral 64 denotes a housing-like member, which is equivalent to the outer ring 4 in the case of a rotational speed detector such as that shown in FIG. 2.

A short cylinder-shaped sensor rotor 25 is firmly fitted on the outer peripheral surface of the rotating member 63. The sensor rotor 25 has a plurality of through-holes 26 which are equally spaced circumferentially, as shown in FIG. 6.

A mounting hole 66 is formed in a portion of the housing-like member 64 which faces the outer peripheral surface of the sensor rotor 25, and a rotational speed sensor 65 is supported inside the mounting hole 66 through a cylindrical casing 67.

More specifically, the casing 67 that is formed from a readily slidable synthetic resin or other similar material has a mounting flange 68 at the proximal end (i.e., the upper end as viewed in FIG. 14). The mounting flange 68 is secured to the periphery of the mounting hole 66 by means of screws. In this state, the body portion 69 of the casing 67 projects inside the housing-like member 64.

A cylindrical holder 70 which is formed by pressing a metal plate is accommodated within the body portion 69 of the casing 67 that is secured to a predetermined portion of the housing-like member 64, as described above, in such a manner that the holder 70 is movable toward and away from the sensor rotor 25.

A rotational speed sensor 65 is retained inside the cylindrical holder 70, and pivot shafts 72 which are parallel to the rotating member 63 are provided at the respective distal end portions of a pair of arm pieces 71 that extend from the end edge portion (i.e., the lower end edge portion as viewed in FIG. 14) of the holder 70.

A roller 75 is rotatably supported around each pivot shaft 72 through a plurality of rolling elements 74 in such a manner that a portion (i.e., the lower end portion as viewed in FIG. 14) of each roller 25 projects closer to the sensor rotor 25 than the distal end portion (i.e., the lower end portion as viewed in FIG. 14) of the rotational speed sensor 65.

A pair of cut portions 73 are formed in the opening end edge portion (i.e., the lower end edge portion as viewed in FIG. 14) of the casing 67, and the proximal end portions of the arm pieces 71 are engaged with the respective cut portions 73, thereby preventing the holder 70 from rotating within the casing 67.

Therefore, the pair of pivot shafts 72 and the rotating member 63 are maintained in a parallel condition at all times although the holder 70 is movable toward and away from the rotating member 63. Accordingly, the rollers 75 that are rotatably supported by the respective pivot shafts 72 and are in contact with the outer peripheral surface of the sensor rotor 25, as described later, rotate in a stable state at all times.

In addition, a compression spring 76 is provided between the inner bottom surface of the body portion 69 of the casing 67 and the proximal end portion of the holder 70 that holds the rotational speed sensor 65.

Thus, the rollers 25 that are rotatably supported by the respective pivot shafts 72 are in resilient contact with the outer peripheral surface of the sensor rotor 25 at respective positions which are off the through-holes 26.

In the rotational speed detector according to the present invention, arranged as described above, the function per se that is performed to detect a rotational speed of the rotating member 63 that has a wheel or the like secured thereto is the same as that of the conventional rotational speed detectors described above.

More specifically, when the rotating member 63 that has a wheel or the like secured thereto rotates, the sensor rotor 25 rotates synchronously with the wheel, and the through-holes 26 that are formed in the sensor rotor 25 cross an end face of the rotational speed sensor 65. As a result, the output voltage from the rotational speed sensor 65 changes regularly, so that a rotational speed of the wheel or the like can be obtained from the frequency of the output voltage.

In the rotational speed detector of the present invention, however, the holder 70 that holds the rotational speed sensor 65 is resiliently pressed toward the outer peripheral surface of the sensor rotor 25 by the resilient force from the compression spring 76 so that the rollers 75 that are rotatably supported by the respective arm pieces 71 secured to the holder 70 are brought into contact with the outer peripheral surface of the sensor rotor 25. Accordingly, the distance l between the end face 65a of the rotational speed sensor 65 and the outer peripheral surface of the sensor rotor 25 is maintained at a constant level at all times independently of errors in manufacturing the housing-like member 64, the rotating member 63 or the sensor rotor 25 and the elastic deformation of these members 64, 63 and 25.

Thus, the rotational speed of the wheel or the like that is supported on the end portion of the rotating member 63 can be detected reliably in a stable state at all times.

Figure 16:
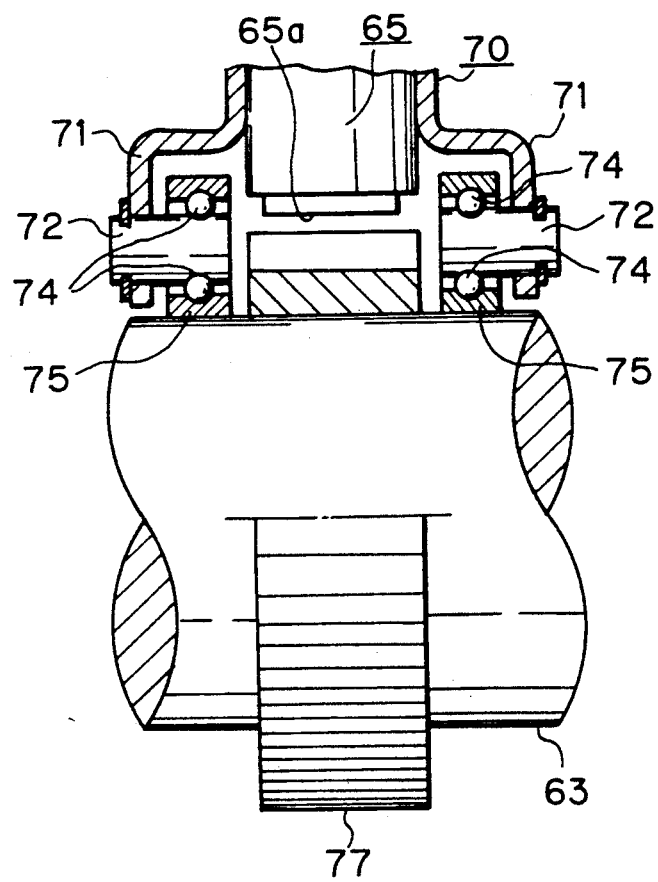
FIG. 16 is a fragmentary sectional view of a fifth embodiment of the rotational speed detector according to the present invention.

A fifth embodiment of the present invention will next be explained with reference to FIG. 16.

In this embodiment, a sensor rotor 77 which has gear teeth-like irregularities formed on the outer peripheral surface is firmly fitted on the outer peripheral surface of the rotating member 63.

Because of the above-described outer peripheral configuration of the sensor rotor 77, the outer peripheral surfaces of the rollers 75 that are rotatably supported by the pair of pivot shafts 72 are brought into direct contact with the outer peripheral surface of the rotating member 63.

The arrangements of the other elements and portions and the functions thereof are the same as those in the fourth embodiment.

What is claimed is:

1. A rotational speed detector which is provided on a first member and a second member, which rotate relative to each other, to detect said relative rotation, said detector comprising:
   a sensor rotor which is secured to said first member;
   a rotational speed sensor assembly which is slidable relative to said first member but unable to rotate relative to said second member; and
   a biasing means which biases said rotational speed sensor assembly toward said sensor rotor so that said rotational speed sensor assembly is in contact with either said sensor rotor or said first member, thereby maintaining the distance between said rotational speed sensor assembly and said sensor rotor at a constant level.

2. A rotational speed detector according to claim 1, wherein said sensor rotor has on its peripheral surface a portion which is defined as an object of detection, said rotational speed sensor assembly being radially biased toward said peripheral surface.

3. A rotational speed detector according to claim 1, wherein said sensor rotor has on one side surface thereof a portion which is defined as an object of detection, said rotational speed sensor assembly being biased toward said side surface in the direction of the axis of rotation.

4. A rotational speed detector according to claim 2 or 3, wherein a part of said rotational speed sensor assembly is formed from a material having a low friction coefficient, said part being in slidable contact with either said sensor rotor or said first member.

5. A rotational speed detector according to claim 2 or 3, wherein said rotational speed sensor assembly is provided with a roller, which is in contact with either said sensor rotor or said first member.

6. A rotational speed detector having a sensor rotor which is rigidly secured to the outer peripheral surface of a rotating member, and a rotational speed sensor which is provided on a housing-like member that surrounds the periphery of said rotating member in such a manner that said sensor faces said sensor rotor, wherein the improvement comprises: said rotational speed sensor which is resiliently supported by said housing-like member, thereby resiliently pressing said rotational speed sensor toward the peripheral surface of said sensor rotor, and a roller which is rotatably supported by a pivot shaft that is secured to said rotational speed sensor in parallel to said rotating member, said roller being brought into contact at its outer peripheral surface with the outer peripheral surface of said sensor rotor, thereby maintaining the distance between said sensor rotor and said rotational speed sensor at a proper value.

7. A rotational speed detector according to claim 6, wherein the outer peripheral surface of said roller is brought into contact with the outer peripheral surface of said rotating member in place of the outer peripheral surface of said sensor rotor.

8. A rotational speed detector according to claim 7, wherein said rotational speed sensor is accommodated in a cylindrical casing that is secured to said housing-like member in such a manner that said sensor is movable toward and away from said rotating member, and a compression spring is provided between said casing and said rotational speed sensor.

9. A rotational speed detector according to claim 8, wherein said rotational speed sensor is retained inside a cylindrical holder that is accommodated inside said casing in such a manner that said holder is movable toward and away from said sensor rotor, said pivot shaft being provided at the distal end portion of an arm piece that extends from the end edge portion of said holder, and the proximal end portion of said arm piece being engaged with a cut portion which is formed in the opening end edge portion of said casing, thereby preventing rotation of said holder within said casing.

* * * * *